United States Patent [19]
Vargiu et al.

[11] 3,716,512
[45] Feb. 13, 1973

[54] FOUNDRY MOLD COMPOSITION

[75] Inventors: Silvio Vargiu; Silvestro Pezzoli, both of Milan; Pierluigi Abruzzi, Bergamo, all of Italy

[73] Assignee: Societa' Italiana Resine S.p.A., Milan, Italy

[22] Filed: Nov. 5, 1971

[21] Appl. No.: 196,208

[30] Foreign Application Priority Data

Nov. 12, 1970 Italy..................31628 A/70

[52] U.S. Cl.........260/29.3, 260/29.4 R, 260/33.4 R, 260/38, 260/39 SB, 260/DIG. 40, 164/43
[51] Int. Cl. ..............................C08g 51/24
[58] Field of Search..........260/29.3, 38, 56, DIG. 40, 260/39 SB, 29.4 R, 33.4 R; 164/22, 43

[56] References Cited

UNITED STATES PATENTS

| | | | |
|---|---|---|---|
| 2,923,989 | 2/1960 | Thomsom | 260/DIG. 40 |
| 3,184,814 | 5/1965 | Brown | 164/43 |
| 3,360,492 | 12/1967 | Tsou | 260/DIG. 40 |
| 3,539,484 | 11/1970 | Bowman et al. | 260/29.3 |

FOREIGN PATENTS OR APPLICATIONS 138,705   9/1950   Australia..............260/38

*Primary Examiner*—Lorenzo B. Hayes
*Attorney*—Richard C. Sughrue et al.

[57] ABSTRACT

A foundry mold composition containing sand and a binder comprising a phenol-formaldehyde-urea-furfuryl alcohol resin with 5 parts or more ethylene glycol to every 100 parts of resin.

8 Claims, No Drawings

FOUNDRY MOLD COMPOSITION

The present invention relates to improvements in binders for sands used for making foundry moulds and cores.

More precisely, it relates to compositions based on special phenol resins suitable for use in foundry work as thermosetting binders for sands used for making moulds and cores, and to the relative manufacturing process.

It is already known in the prior art to use phenol resins as thermosetting binders for sands or other inert granular materials used for making foundry moulds and cores.

For this purpose, in practice, to sands of specific properties or other inert granular materials, first suitable hardeners are added in the form of aqueous solutions, followed by phenol resins.

The mixture is then blended to achieve a complete dispersion. The resultant mixture is used for making the moulds and cores.

For final hardening, the moulds and cores are heat treated.

A very important aspect in the selection of a good binder is its capacity to impart certain specific properties to the sandy mixture.

In particular, the longer the "charge life" imparted to the mixture and the higher the mechanical properties of the moulds and cores finally obtained from such a mixture, the better is the binder.

The term "charge life" of the mixture relates to the time for which the mixture itself remains workable, or more simply the percentage fluidity of the mixture.

It is also important that the moulds and cores be sufficiently manageable prior to final setting so that they can be shifted, combined, altered with no danger of breakage or crumbling.

In other words, a good binder must give the core or the mould a high "green cohesion," this term relating to the capacity of the binder to maintain the grains of sand bonded together prior to hardening.

Finally, it is also very important for the heat hardening of the binder to take place as rapidly as possible.

After all, the shorter the thermosetting time and the longer and higher are the "charge life" and "green cohesion" respectively of the sandy mixture, and the higher the mechanical properties of the moulds and cores obtained from such mixtures, the better the binder. The phenol resins used in industry as binders for moulding sands are rarely characterized by the simultaneous presence of high qualities in all these sectors.

More frequently in the manufacture of such resins, the attainment of high values in some of such properties implies a substantial deterioration in the other properties of the same resin. In view of the fact that in binding resins for foundry sands, it is however normally required that all the above-mentioned properties be present, it is usual to be satisfied with producing resins which have intermediate values in all these properties. Obviously, this creates difficulties in production and in the use of the mixtures and subsequently in the moulds and cores used in the foundry.

Now, particular phenol resin based compositions have been found which are particularly suitable for use as binders for thermosetting foundry moulding and core sands, which offer substantial improvements in some properties in respect of the resins used for this purpose in industry, without detriment to the other properties.

In particular, the compositions in question, as compared with the phenol resins of the prior art which are used for foundry sands, are characterized by considerable improvement in "charge life" of the sand mixtures and in the mechanical properties of the cores and moulds produced from such mixtures, while at the same time very short setting times and high values of "green cohesion" are maintained.

More precisely, such compositions are produced by initially condensing phenol and formaldehyde in a molar ratio comprised between 1:1.2 and 1:3 in the presence of a base, so that the pH is comprised in the range from 7.5 to 9 at a temperature of between 50° and 100°C for a period of between 20 minutes and 240 minutes.

Possible bases which may be used are any compounds having such characteristics (inorganic or organic bases, oxides of alkali metals or alkaline earth metals, basic salts).

The product obtained is then condensed at a temperature between 70° and 100°C and preferably at 100°C, and a pH between 5 and 6 with furfuryl alcohol, urea and formaldehyde. For this purpose, the product of condensation of phenol and formaldehyde has furfuryl alcohol added to it in a molar ratio of 1:10 to 1:15 in respect of the phenol, together with urea and formaldehyde so that the phenol/urea molar ratio is between 1:0.2 and 1:0.7 while the urea/formaldehyde molar ratio is between 1:3 and 1:6.

The whole is maintained under reflux at 100°C until a product is obtained which has a free formaldehyde content not exceeding 14 percent and a setting time at 120°C of between 12 minutes and 20 minutes.

The new product is then dehydrated in a vacuum at a temperature of between 40° and 90°C to a viscosity of 1,000 to 50,000 cps. measured at 25°C.

An essential aspect of the present invention is the addition of ethylene glycol to the phenol-urea-furfuryl alcohol resin produced as above, so that its percentage in the resin is in excess of 5 percent and is preferably between 10 and 15 percent. It is surprising to note that only ethylene glycol, and in a percentage above 5 percent, guarantees the above specified properties in such phenol-urea-furfuryl alcohol resins, particularly a remarkable improvement in the "charge life" and in the mechanical properties compared with the resins used industrially for this purpose, in addition to demonstrating high "green cohesion" properties and short setting time.

In fact, the use of homologues of glycol or mono or polyhydroxy alcohols does not constitute any advantage over the resins used industrially as foundry sand binders.

However, in the preparation of phenol-urea-furfuryl resins as above, the phenol may be wholly or partly substituted by homologues alone or in mixtures among one another.

The formaldehyde moreover may be used in aqueous solution or as paraformaldehyde, and again in the form of products which release formaldehyde.

The urea may be substituted by its derivatives, by melamine or by dicyanodiamide.

The resins which are thus prepared, which have a good storage life, are blended with siliceous sands or other inert granular material which will have been previously mixed with a suitable hardener. The resins are added to the sands in quantities such as to ensure that the mixtures have from 1 to 5 parts by weight of resin to every 100 parts by weight of sand. For mixing, it is possible to use the apparatus normally employed in preparing foundry compositions and the mixtures are used in the preparation of moulds and cores. In this case, too, it is possible to use conventional blowing and moulding machines and it is also possible to use manual systems. As hardeners, it is possible usefully to employ neutral aqueous solutions of urea and ammonia salts in proportions of 1:1 to 3:1 by weight. As neutralizing bases, it is possible to use organic or inorganic bases, oxides of alkali metals or alkaline earth metals, or basic salts. Hardening normally takes place by placing the moulds and cores in an oven at a temperature of 160° to 220°C.

The following examples constitute a better illustration of the scope of the present invention without in any way limiting the same.

EXAMPLE 1

372 parts 36 percent formaldehyde and 227 parts 100 percent phenol were placed in a glass vessel with three necks, fitted with an agitator, gravity cooler and a thermometer. All the parts are understood as being expressed by weight. Under careful agitation, the pH was raised to approx. 8.2 by the addition of a 45 percent aqueous soda solution. In 60 minutes, the temperature was raised to 70°C and the whole was maintained at this temperature for approx. 3 hours. On completion, the percentage of free formaldehyde in the reaction mixture was 4 percent and the setting time, measured at 150°C, was approx. 4 minutes. The result was cooled to 60°C and 8.70 parts urea, 187 parts 36 percent formaldehyde and 18.7 parts furfuryl alcohol were added. By the addition of glacial acetic acid, under agitation, the pH was then modified to approx. 5.5, 105 parts by weight 97 percent paraformaldehyde were then added and the mixture was carefully heated to 100°C.

Reflux conditions were maintained at 100°C until a percentage of free formaldehyde equal to approx. 10 percent and a hardening time of approx. 17 minutes, measured at 120°C, were attained. Then the temperature of the mixture was brought to 70°C and the mixture was distilled with residual pressure of 100 mm Hg until the viscosity of 5,000 c.p.s. at 25°C was attained. The resultant product, after cooling, was used to agglomerate French-type dried siliceous sand with a granulation size of 65 A.F.A.

For this purpose, 100 g of sand were placed in a suitable mixer to which the hardener was then added, consisting of the aqueous solution obtained by dissolving 14 g urea and 38 g ammonium chloride in 48 g water and neutralizing to pH 7 with ammonia.

The sand and the hardener were closely blended and then 20 g resin produced as above were added to them. The whole was further blended until a uniform distribution of the binder in the sand was achieved. The resultant mixture was used for "green cohesion," thermosetting rate, "charge life" and mechanical strength.

The "green cohesion" is expressed as the resistance of the mixture to compression prior to hardening under the heat.

The test was conducted on cylindrical specimens, type + GF + 591.006, of 5 cm diameter and 5 cm high, which were produced with the sand/resin/hardener mixture, the sand being struck with six blows with a + GF + 591.007 hammer. The samples were immediately subjected to the compression resistance test using the + GF + 591.020 dynamometer.

The charge life is expressed as the percentage fluidity of the mixture as a function of the contact time at the moment when the mixture was prepared.

Determination of the percentage fluidity was carried out using the GM – 1100 method of + GF + using a + GF + 600070 apparatus.

The fluidity of the ideal mixture was assumed to be 100 percent. The minimum fluidity required for using the cores is 60 percent, below and up to 50 percent the mixture may still be used for making cores, but only by hand. To determine the rate of hardening under heat, cylindrical samples were used, type + GF + 591.006, 5 cm in diameter and 5 cm high, produced as specified above, being placed in an oven at 220°C. After 3 minutes, 5 minutes and 10 minutes, samples were removed which were then cut in half at once parallel with the base.

Since cylindrical samples are hardened concentrically from the outside inwards, for convenience the radii of the circular rings constituting the orthogonal section of the hardened part were taken as the measurement of the hardening as a whole.

Hardening was regarded as complete when the radii of the circular rings equalled the radius of the base circle, in other words 25 mm.

Considered as mechanical properties were the resistance to compression and resistance to flexion as a function of the hardening time.

Compression resistance tests were carried out on cylindrical samples as above, after 3 minutes, 5 minutes and 10 minutes of hardening in an oven at 220°C, using the GF 591,020 dynamometer.

Resistance to flexion was determined by initially preparing specimens of parallepiped form in keeping with + GF + 591004 instructions, using mixtures produced as described above. These samples were hardened at 220°C for 3 minutes, 5 minutes, 10 minutes, 15 minutes and 20 minutes.

After cooling, the resistance to flexion was determined by using a dynamometer and + GF + 591026 apparatus.

All the inspection devices used were made by Georg Fischer S.A. of Schaffhausen. Results of the tests are set out in column 1 of Table 1.

EXAMPLE 2

Using the same procedure, the same reagent and the same quantitative proportions as in Example 1, a phenol-urea-furfuryl resin for foundry sands was produced. The residual product of distillation with a residual pressure of 100 mmHg and a viscosity of 5,000 c.p.s. at 25°C, instead of being cooled and discharged as in Example 1, had 118 parts by weight ethylene glycol added to it. After the whole had been allowed to homogenize and cool, the product obtained was discharged and then subjected to the applications and inspections as described in Example 1. The results of the tests are described in column 2 of Table 1 attached.

EXAMPLE 3

The same procedure was carried out as for Example 1, 79 parts by weight ethylene glycol being added to the phenol-urea-furfuryl resin. The results of the tests carried out on the product obtained after homogenization and cooling are described in column 3 of Table 1.

EXAMPLE 4

Again, the procedure of Example 1 was adopted, 39.5 parts by weight of ethylene glycol being added to the phenol-urea-furfuryl resin. The results of the tests carried out on the product obtained after homogenization and cooling are set out in column 4 of Table 1 attached.

EXAMPLE 5

The procedure of Example 1 was followed, 118 parts by weight glycerin being added to the phenol-urea-furfuryl resin with a viscosity of 5,000 c.p.s. at 25°C. The product obtained, after homogenization and cooling, had when discharged a charge life measured as a percentage fluidity equal to 83 which dropped to 32 after 30 minutes. After 60 minutes, the product was completely hard and therefore useless for the purposes of the invention.

TABLE 1

| Characteristic features | 1 | 2 | 3 | 4 |
| --- | --- | --- | --- | --- |
| Charge life as % fluidity: | | | | |
| – on discharge | 93 | 95 | 97 | 80 |
| – after 30' | 53 | 93 | 90 | hard |
| – after 60' | – | 86 | 80 | – |
| – after 90' | – | 80 | 75 | – |
| – after 120' | – | 75 | 60 | – |
| – after 150' | – | 58 | – | – |
| Hardening rate at 220°C: | | | | |
| – cross-section fired after 3', in mm | 5 | 6 | 7 | 7 |
| – cross-section fired after 5', in mm | 10 | 10 | 13 | 12 |
| – cross-section fired after 10', in mm | 25 | 25 | 25 | 25 |
| Green cohesion : | | | | |
| Compression strength g/sq.cm. | 45 | 40 | 46 | 44 |
| Compression strength as a function of the hardening time at 220°C: | | | | |
| – after 3' | 68 | 170 | 178 | 118 |
| – after 5' | 104 | 218 | 190 | 157 |
| – after 10' | 155 | 260 | 230 | 138 |
| Resistance to flexion as a function of the time at 220°C kg/sq.cm.: | | | | |
| – after 3' | 37 | 50 | 75 | 45 |
| – after 5' | 71 | 80 | 95 | 60 |
| – after 10' | 85 | 100 | 100 | 75 |
| – after 15' | 80 | 115 | 105 | 80 |
| – after 20' | 65 | 120 | 120 | 85 |

EXAMPLE 6

The procedure adopted was that of the previous example, 79 parts by weight glycerin being added to the phenol-urea-furfuryl resin. The product obtained after homogenization and cooling, exhibited on discharge a charge life measured as percentage fluidity equal to 78, which dropped to 30 after 30 minutes. The product is completely hard after 60 minutes.

EXAMPLE 7

Here, too, the procedure of Example 5 was adopted, but 39.5 parts by weight glycerin were added to the phenol-urea-furfuryl resin. The product obtained, after homogenization and cooling, had a charge life measured as percentage fluidity, equal to 80 at discharge, but it fell to 33 after 30 minutes. After 50 minutes, the product was completely hard.

EXAMPLE 8

The procedure adopted was that in Example 1, 118 parts by weight propylene glycol being added to the phenol-urea-furfuryl resin of viscosity 5,000 c.p.s. at 25°C. After homogenization and cooling, the product discharged had a charge life measured as percentage fluidity of 86, but this dropped to 36 after after 30 minutes. After 50 minutes, the product was completely hard.

EXAMPLE 9

The procedure carried out was that of the previous Example, 70 parts by weight propylene glycol being added to the phenol-urea-furfuryl resin. After homogenization and cooling, and at the time of being discharged, the product obtained had a charge life of 86, in terms of percentage fluidity, but this reduced to 33 after 36 minutes. After 60 minutes, the product was completely hard.

EXAMPLE 10

The procedure carried out was that according to Example 1, 39.5 parts propylene glycol being added to the phenol-urea-furfuryl resin. After homogenization and cooling, and at the time of discharge, the product obtained had a charge life of 90, measured as a percentage of fluidity, but this reduced to 20 after 30 minutes, and after 60 minutes the product was completely hard.

We claim:

1. In a moulding composition suitable for making foundry moulds and cores comprising sand and a binder comprising a thermosetting resin, said binder being present in an amount of from 1 to 5 parts by weight per 100 parts by weight of sand, the improvement wherein said binder consists essentially of a mixture of a thermosetting resin consisting essentially of a condensation product of phenol, formaldehyde, urea and furfuryl alcohol having a viscosity of 1,000 to 50,000 centipoises at 25°C and greater than 5 percent by weight, based on the weight of said condensation product, of ethylene glycol.

2. The composition of claim 1 wherein said mixture consists essentially of said thermosetting resin and from 10 to 15 percent by weight, based on the weight of said resin, of ethylene glycol.

3. The composition of claim 2 wherein said thermosetting resin consists essentially of a water-free secondary condensation product of:
   a. a primary condensation product of phenol and formaldehyde in a molar ratio of from 1:1.2 to 1:3; with
   b. furfuryl alcohol, urea and formaldehyde wherein the molar ratio of furfuryl alcohol to the phenol in the primary condensation product varies from 1:10 to 1:15, wherein the molar ratio of phenol in the primary condensation product to urea varies from 1:0.2 to 1:0.7 and wherein the molar ratio of urea to formaldehyde varies from 1.3 to 1.6; said secondary condensation product having a free formaldehyde content not exceeding 14 percent by weight and a setting time at 120°C of from 12 to 20 minutes.

4. The composition of claim 3 wherein said phenol is selected from the group consisting of phenol, homologues thereof and mixtures thereof; wherein said formaldehyde is selected from the group consisting of an aqueous solution of formaldehyde, paraformaldehyde and a compound which releases formaldehyde; and wherein said urea is utilized in the form of a member selected from the group consisting of urea, melamine and dicyanodiamide.

5. The composition of claim 2 further consisting essentially of a sufficient amount of a hardener such that said composition hardens by heating it at a temperature of from 160° to 220°C.

6. The composition of claim 5 wherein said hardener comprises a neutral aqueous solution of urea and an ammonia salt in a proportion, by weight, of 1:1 to 3:1.

7. The composition of claim 3 wherein the phenol and formaldehyde condensed to form said primary condensation product are condensed in the presence of a base at a pH of from 7.5 to 9 and a temperature of from 50° to 100°C, said condensation being conducted in a period of time of from 20 to 240 minutes.

8. The composition of claim 3 wherein said secondary condensation product is obtained by a condensation reaction at a temperature between 70 and 100°C and at a pH between 5 and 6.

* * * * *